(12) United States Patent
Zhang et al.

(10) Patent No.: US 12,475,682 B1
(45) Date of Patent: Nov. 18, 2025

(54) SMALL TARGET DETECTION METHOD BASED ON IMPROVED YOLOv8

(71) Applicant: NANJING UNIVERSITY OF POSTS AND TELECOMMUNICATIONS, Nanjing (CN)

(72) Inventors: Dengyin Zhang, Nanjing (CN); Jia Zhong, Nanjing (CN); Yu Qiu, Nanjing (CN)

(*) Notice: Subject to any disclaimer, the term of this patent is extended or adjusted under 35 U.S.C. 154(b) by 0 days.

(21) Appl. No.: 19/025,418

(22) Filed: Jan. 16, 2025

Related U.S. Application Data

(63) Continuation of application No. PCT/CN2025/071460, filed on Jan. 9, 2025.

(30) Foreign Application Priority Data

May 15, 2024 (CN) .......................... 202410604466.6

(51) Int. Cl.
*G06V 10/764* (2022.01)
*G06V 10/82* (2022.01)
(52) U.S. Cl.
CPC ............ *G06V 10/764* (2022.01); *G06V 10/82* (2022.01)
(58) Field of Classification Search
CPC ............................. G06V 10/764; G06V 10/82
See application file for complete search history.

(56) References Cited

U.S. PATENT DOCUMENTS

2019/0147318 A1* 5/2019 Howard ................. G06N 3/045
706/27

FOREIGN PATENT DOCUMENTS

| CN | 113378890 A | * | 9/2021 | ....... G06F 18/23213 |
|---|---|---|---|---|
| CN | 115471670 A | | 12/2022 | |
| CN | 115565044 A | | 1/2023 | |
| CN | 116844030 A | * | 10/2023 | ............. G06V 20/00 |
| CN | 117292313 A | * | 12/2023 | ............. G06V 20/52 |
| CN | 117746015 A | * | 3/2024 | ............. G06V 20/00 |
| EP | 4300265 A1 | | 1/2024 | |

OTHER PUBLICATIONS

Ye, R.; Shao, G.; He, Y.; Gao, Q.; Li, T. YOLOv8-RMDA: Lightweight YOLOv8 Network for Early Detection of Small Target Diseases in Tea. Sensors 2024, 24, 2896. https://doi.org/10.3390/s24092896 (Year: 2024).*

* cited by examiner

*Primary Examiner* — Ross Varndell

(57) ABSTRACT

The present disclosure discloses a small target detection method based on improved YOLOv8, including: inputting a small target image to be detected into a pre-trained small target detection model based on the improved YOLOv8 for identification to obtain a detection result, where a method for training a small target detection model based on the improved YOLOv8 includes: acquiring a small target image data set and dividing the small target image data set into a training set and a validation set; replacing a backbone network of YOLOv8 with a backbone network ATDeNet and constructing the small target detection model based on the improved YOLOv8; and training the constructed small target detection model by using the training set and the validation set to obtain a trained small target detection model based on the improved YOLOv8. The accuracy and efficiency of small target detection can be significantly improved.

5 Claims, 5 Drawing Sheets

SMALL TARGET DETECTION METHOD BASED ON IMPROVED YOLOv8

CROSS-REFERENCE TO RELATED APPLICATIONS

The present application claims priority to Chinese Patent Application No. 202410604466.6, filed on May 15, 2024, the entire disclosure of which is incorporated herein by reference.

TECHNICAL FIELD

The present application belongs to the field of target detection of computer vision, and in particular, relates to a small target detection method based on improved YOLOv8.

BACKGROUND

With the rapid development of unmanned aerial vehicle industry, unmanned aerial vehicles equipped with cameras have been deployed to all walks of life. Images transmitted by the unmanned aerial vehicles generally have the characteristics of large field of vision and much information, which can provide information that cannot be given by ground shooting. However, with the raising of the viewing angle and the reduction of the object size in the image, it is more difficult to process unmanned aerial vehicle image information than the traditional image. The unmanned aerial vehicle image has the characteristics of small target size, little appearance and geometric information and complicated background, which bring great challenges to target detection. Therefore, how to improve small target detection is an important topic in the field of computer vision.

You Only Look Once (YOLO) algorithm has played an important role in the technical field of real-time target detection since it was first launched in 2015. After several iterations and upgrades, each generation is committed to improving detection efficiency, accuracy and practicality. YOLOv1 takes the lead in adopting an overall prediction framework and abandoning the generation of candidate regions, thereby achieving an ultra-fast real-time detection speed. Although the positioning accuracy is relatively insufficient, YOLOv1 leads the new direction of real-time target detection with its unique advantages. Subsequently, during the evolution from YOLOv2 to YOLOv8, the latest research results of deep learning were continuously absorbed and integrated. Through multi-scale training, network structure adjustment, data enhancement technology and the application of various innovative technologies such as weighted residual connection and cross-stage partial connection, the detection accuracy was gradually improved and the high-speed operation characteristics were ensured. Especially in the YOLOv8 stage, it not only made a great breakthrough in speed and accuracy, but also paid more attention to meeting the requirements of real-time and high classification performance in industrial scenarios, which made YOLO series widely used in automatic quality inspection and other related fields and became a model of the progress of the real-time target detection technology in the field of computer vision.

However, YOLOv8 still suffers from significant feature loss in deep networks and limited feature fusion capabilities in small target detection, making it challenging to ensure both accuracy and efficiency.

SUMMARY

An objective of the present disclosure is to overcome the defects in the related art and provide a small target detection method based on improved YOLOv8. A novel backbone network, ATDeNet, integrating an ATDE module and a mixed spatial pyramid structure (MixSPP), is introduced to replace the original backbone network of YOLOv8 backbone. This modification mitigates feature loss for small targets in deep networks, thereby improving detection accuracy and efficiency.

To achieve the foregoing objective, the present disclosure is implemented by the following technical solution.

According to a first aspect, the present disclosure provides a small target detection method based on improved YOLOv8, including:

inputting a small target image to be detected into a pre-trained small target detection model based on the improved YOLOv8 for identification to obtain a detection result, where a method for training a small target detection model based on the improved YOLOv8 includes:

acquiring a small target image data set and dividing the small target image data set into a training set and a validation set;

replacing a backbone network of YOLOv8 with a backbone network ATDeNet and constructing the small target detection model based on the improved YOLOv8; and training the constructed small target detection model by using the training set and the validation set to obtain a trained small target detection model based on the improved YOLOv8.

Further, the replacing a backbone network of YOLOv8 with a backbone network ATDeNet and constructing the small target detection model based on the improved YOLOv8 includes:

constructing the backbone network ATDeNet, where the backbone network ATDeNet includes an input layer Stem, a first backbone part Stage1, a second backbone part Stage2, a third backbone part Stage 3 and a fourth backbone part Stage 4, the input layer Stem includes a convolution layer, the first backbone part Stage1 includes a convolution layer and an ATDE module, the second backbone part Stage2 includes a convolution layer and an ATDE module, the third backbone part Stage3 includes a convolution layer and a first convolution module ATDE, the fourth backbone part Stage4 includes a convolution layer and a pyramid structure module MixSPP, where the backbone network ATDeNet adopts the design of reducing the size of a convolution kernel step by step, specifically, (7, 5, 3, 3), and adopts the design of a convolution depth (1, 1, 3, 1), so that the receptive field of a subsequent prediction feature map can be reduced while increasing the receptive field at the beginning of detection, thereby avoiding excessive redundant background information, the first convolution module ATDE can perform multi-level splicing on images, use 1*1 convolution to increase dimension and then decrease dimension, and extract spatial details of the images, and the pyramid structure module MixSPP parallelizes spatial pyramid pooling and convolution modules and performs layer-by-layer fusion; and replacing the backbone network of YOLOv8 with the backbone network ATDeNet and constructing the small target detection module based on the improved YOLOv8.

Further, the first convolution module ATDE includes a depthwise separable convolution and a convolution with a convolution kernel of 1*1, so that the network can capture input data of the model better and improve the expression ability and information processing ability of the model.

The pyramid structure module MixSPP includes a convolution layer, a maximum pooling layer and a depthwise separable convolution, so that the loss of multi-scale information in the fusion process can be reduced. Even if the response of the pyramid pool to the target is weak and a plurality of 1*1 convolutions are stacked after feature extraction, the overfitting risk can also be reduced, and the robustness of the model can be improved.

Further, the convolution layers include batch normalization (BN) and a SiLU activation function, and are provided with different convolution parameters.

Further, the small target image data set is derived from a VisDrone2019 target detection data set.

Further, the small target image data set includes small target images under different scenarios, weather and light conditions.

Further, the method further includes: dividing a test set from the small target image data set, and using the test set to analyze the detection accuracy, detection speed and parameter quantity of the trained small target detection model based on the improved YOLOv8.

According to a second aspect, the present disclosure provides a small target detection system based on improved YOLOv8, including:
  a detection module, configured to input a small target image to be detected into a pre-trained small target detection model based on the improved YOLOv8 for identification to obtain a detection result,
  where a method for training a small target detection model based on the improved YOLOv8 includes:
  acquiring a small target image data set and dividing the small target image data set into a training set and a validation set;
  replacing a backbone network of YOLOv8 with a backbone network ATDeNet and constructing the small target detection model based on the improved YOLOv8; and
  training the constructed small target detection model by using the training set and the validation set to obtain a trained small target detection model based on the improved YOLOv8.

According to a third aspect, the present disclosure provides a computer storage medium, storing a computer program thereon, characterized in that when the computer program is executed by a processor, the above small target detection method based on improved YOLOv8 is implemented.

Compared with the related art, the present disclosure achieves the following beneficial effects:

(1) The detection method provided by the present disclosure is based on a YOLOv8 target detection algorithm, thereby having high detection accuracy in normal environments. According to the present disclosure, the backbone extraction network of YOLOv8 is replaced with the backbone network ATDeNet for small target detection, so that the model can effectively extract spatial detail information of the image and improve the detection accuracy of the small target.

(2) The present disclosure provides a convolution module-ATDE with stronger feature extraction ability, so that the spatial detail information of the image can be effectively extracted, and the detection accuracy of small target detection can be improved.

(3) The present disclosure provides a backbone network-ATDeNet for the small target. The network re-designs a receptive field, so that the receptive field of a bottom feature map is small, the receptive field of a top feature map is large, and the characteristic of small target detection is adapted.

(4) The present disclosure provides a new mixed space pyramid structure-MixSPP. The structure parallelizes spatial pyramid pooling and convolution modules and performs layer-by-layer fusion, thereby reducing the loss of multi-scale information in the fusion process.

DETAILED DESCRIPTION OF THE EMBODIMENTS

Figure 1:
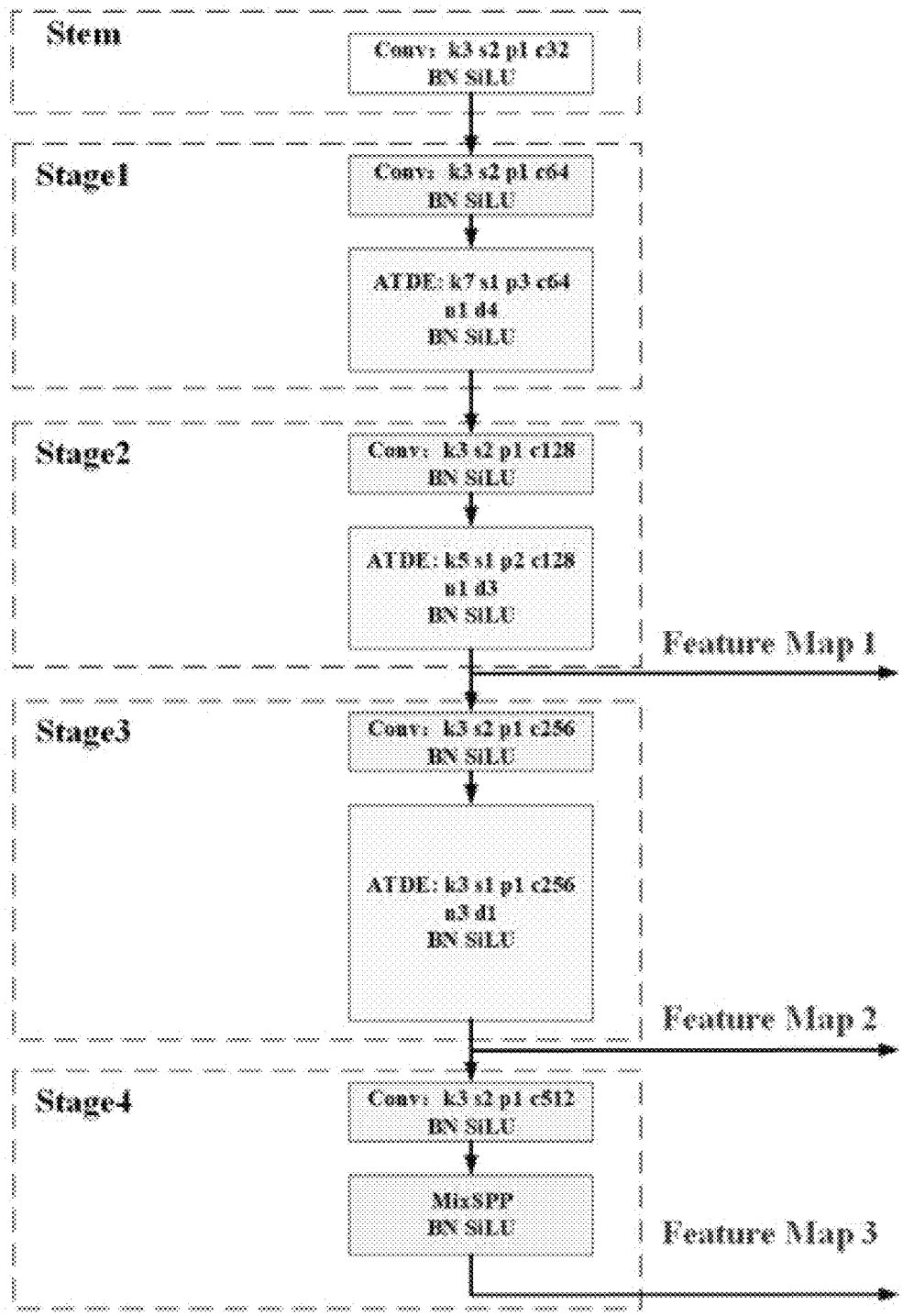
FIG. 1 is a structural schematic diagram of a backbone network ATDeNet.

The technical concept of the present disclosure is as follows. An ATDeNet network for small target detection is replaced with a backbone network of YOLOv8, so that a model can effectively extract spatial detail information of an image and improve the detection accuracy of a small target; by using the ATDE module, the spatial detail information of the image can be effectively extracted and the detection accuracy of small target detection can be improved; meanwhile, a mixed space pyramid structure MixSPP is adopted, and the structure parallelizes space pyramid pooling and convolution modules and adopts a layer-by-layer fusion mode, thereby reducing the loss of multi-scale information in the fusion process.

The technical solutions in the embodiments of the present application are clearly and completely described below with reference to the accompanying drawings in the embodiments of the present application. Apparently, the described embodiments are merely some rather than all of the embodiments of the present application. The following description of the at least one exemplary embodiment is actually merely illustrative and never constitutes any limitation to the present application and application or use thereof.

Embodiment 1

This embodiment discloses a small target detection method based on improved YOLOv8, including:
  a small target image to be detected is input into a pre-trained small target detection model based on the improved YOLOv8 for identification to obtain a detection result,
  where a method for training a small target detection model based on the improved YOLOv8 includes:
  a small target image data set is acquired and divided into a training set and a validation set;
  a backbone network of YOLOv8 is replaced with a backbone network ATDeNet and constructing the small target detection model based on the improved YOLOv8;

the constructed small target detection model is trained by using the training set and the validation set to obtain a trained small target detection model based on the improved YOLOv8.

In the small target detection method based on improved YOLOv8 provided by this embodiment, the contents involved in this embodiment are described below in combination with a preferred embodiment.

The software configuration environment of this embodiment is: CentOS 7 operating system, Python version 3.8.18, GPU version NVIDIA TITAN Xp 12G, CUDA version 11.3, Pytorch version 1.12.1 and MMDetection version 3.2.0.

S1: a small target image data set is acquired and divided into a training set, a validation set and a test set. An unmanned aerial vehicle data set selected by this embodiment is a VisDrone2019 target detection data set which was opened by Tianjin University and other teams in 2019. There are 6471 training sets and 548 verification sets provided by the government, including 10 types of targets. The data set is collected by using different types of unmanned aerial vehicles under different scenarios, weather and light conditions, which can objectively reflect the performance of a detector.

S2: a backbone network ATDeNet is constructed. Referring to the structural schematic diagram of the backbone network ATDeNet shown in FIG. 1, the backbone network ATDeNet includes an input layer Stem, and four backbone parts Stage1, Stage2, Stage 3 and Stage 4.

The input layer inputs an image with an image resolution of 640*640.

The input layer Stem includes a convolution layer with a convolution kernel of 3*3, a step length of 2, a padding of 1 and a quantity of output channels of 32. The convolution layer includes batch normalization (BN) and a SiLU activation function.

The Stage 1 includes a convolution layer with a convolution kernel of 3*3, a step length of 2, a padding of 1 and a quantity of output channels of 64 and including batch normalization (BN) and a SiLU activation function, and an ATDE module with a parameter n set to 1 and a parameter d set to 4.

Referring to FIG. 1, the Stage 2 and the Stage3 are similar in structure to the Stage1 described above, and the only difference is the difference in convolution parameters, which will not be elaborated here.

The Stage 4 includes a convolution layer with a convolution kernel of 3*3, a step length of 2, a padding of 1 and a quantity of output channels of 512 and including batch normalization (BN) and a SiLU activation function, and a MixSPP module.

Figure 2:
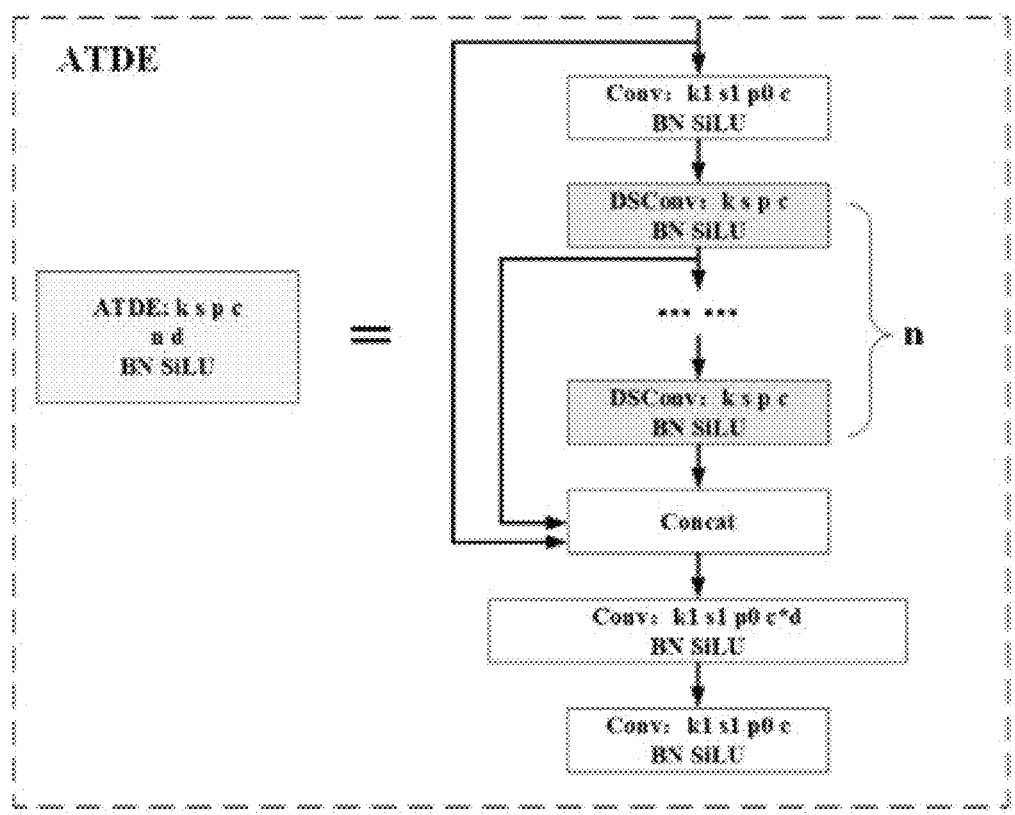
FIG. 2 and FIG. 3 are structural schematic diagrams of an ATDE convolution module.
Figure 3:
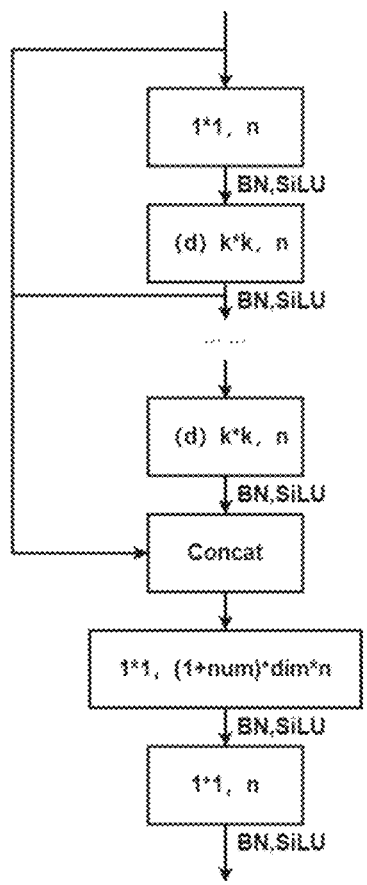

Referring to FIG. 2 and FIG. 3, the ATDE module includes n depthwise separable convolutions and three convolutions with a convolution kernel of 1*1, where each of the convolutions is followed by a batch normalization layer and an activation function. The ATDE module splices an input image with images that have undergone a depthwise separable convolution and n depthwise separable convolutions to form a new feature map to improve the expression ability of the feature map. Then the spliced feature map is mapped to a high dimension by using the 1*1 convolution, where the dimension is (1+d)*n, and is restored to the original dimension by the 1*1 convolution.

Figure 4:
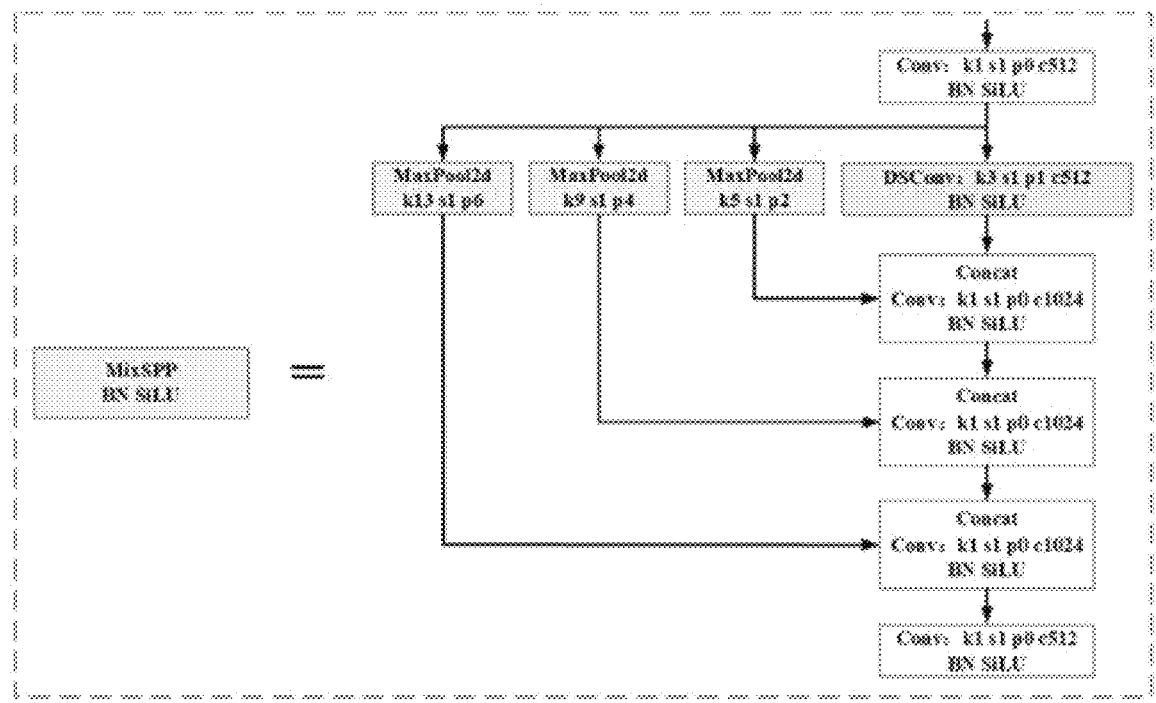
FIG. 4 and FIG. 5 are structural schematic diagrams of a mixed pyramid MixSPP module.
Figure 5:
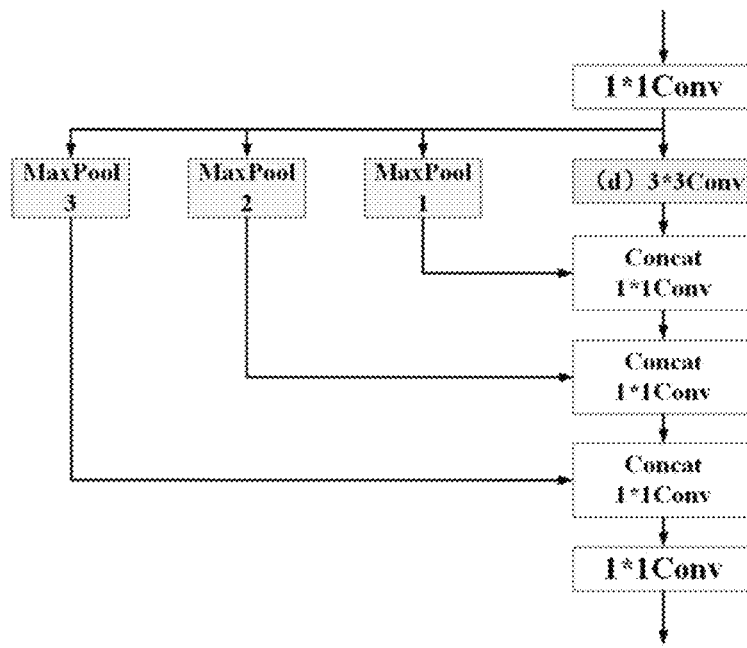

Referring to FIG. 4 and FIG. 5, the MixSPP module includes 5 convolutions, 3 maximum pooling layers, a depthwise separable convolution and the like. The MixSPP module uses a convolution layer with a convolution kernel size of 1*1, a stride of 1, no padding and a quantity of output channels of 512 to perform convolution operation on the image, and preliminarily processes the image by the batch normalization and the SiLU activation function; and then, the image is divided into three regions with different sizes for maximum pooling operation. The three regions have the convolution kernel sizes of k13*13, k9*9 and k5*5 respectively, the stride of 1 and no padding. The maximum pooling result of each region is used as separate feature mapping; and then these features mapping passes through a depthwise separable convolution layer (DSConv), including a depthwise convolution layer and a point-by-point convolution layer. The parameters of the layer are: k=3, S=1, p=1 and c=512, which means using a depthwise convolution layer with a convolution kernel of 3*3, a stride of 1, a padding of 1 and a quantity of output channels of 512. Similarly, this layer further includes batch normalization and a SiLU activation function; and finally, the feature mapping of the original input image and the feature mapping passing through the DSConv layer are spliced. The spliced feature mapping passes through three continuous convolution layers, the parameters of each of the convolution layers are: the convolution kernel being 1*1, the stride being 1, no padding, and the quantity of output channels being 1024, and the convolution layers are followed by the batch normalization and the SiLU activation function. Finally, the spliced feature mapping passes through the last convolution layer with the parameters: k=1, s=1, p=0 and c=512, and the output feature mapping is generated. Finally, the spliced feature mapping passes through the last convolution layer with the parameters: k=1, s=1, p=0 and c=512, and the output feature mapping is generated. The MixSPP module can reduce the loss of multi-scale information in the fusion process by combining with different sizes of pooling operations and depthwise separable convolutions. Even if the response of the pyramid pool to the target is weak and a plurality of 1*1 convolutions are stacked after feature extraction, the overfitting risk can also be reduced, and the robustness of the model can be improved.

S3: a backbone network of YOLOv8 in step S2 is replaced with a backbone network ATDeNet and the small target detection model is constructed based on the improved YOLOv8.

S4: a small target detection model constructed in step S3 is trained. The training set and the validation set in the data set in step S1 are sent to the constructed small target detection model based on YOLOv8 for training to obtain a trained model.

Training parameters are set, the batch size is set to 8, stochastic gradient descent (SGD) is used as an optimizer, Kaiming is used as a weight initialization method, the number of training rounds is set to 150, the number of rounds of turning off data enhancement is 130, the learning rate lr is 0.01, and the weight attenuation is 0.0005.

A comprehensive loss function is used in the training, which combines classification loss, bounding box regression loss and distribution focal loss, synthesizes all kinds of losses and weights and adds a regularization term to prevent overfitting. The specific form of the loss function is as follows:

$$\mathcal{L} = \frac{\lambda_{box}}{N_{pos}} \sum_{x,y} \mathbb{1}_{c^*_{x,y}} \left[ 1 - q_{x,y} + \frac{\|b_{x,y} - \hat{b}_{x,y}\|_2^2}{\rho^2} + \alpha_{x,y} v_{x,y} \right] +$$

-continued $$\frac{\lambda_{cls}}{N_{pos}} \sum_{x,y} \sum_{c \in classes} y_c \log(\hat{y}_c) + (1-y_c)\log(1-\hat{y}_c) +$$

$$\frac{\lambda_{dfl}}{N_{pos}} \sum_{x,y} \mathbb{1}_{c^*_{x,y}} \left[-(q_{(x,y)+1} - q_{x,y})\log(\hat{q}_{x,y}) + (q_{x,y} - q_{(x,y)-1})\log(\hat{q}_{(x,y)+1})\right]$$

where $\lambda_{cls}$ is classification loss weight, $\lambda_{box}$ is box loss weight, and $\lambda_{dfl}$ is distribution focal loss weight.

The specific formulas of $q_{x,y}$, $v_{x,y}$, $\alpha_{x,y}$, $\hat{y}_c$ and $\hat{q}_{x,y}$ are as follows:

$$q_{x,y} = IoU_{x,y} = \frac{\hat{\beta}_{x,y} \cap \beta_{x,y}}{\hat{\beta}_{x,y} \cup \beta_{x,y}}$$

$$v_{x,y} = \frac{4}{\pi^2}\left(\arctan\left(\frac{w_{x,y}}{h_{x,y}}\right) - \arctan\left(\frac{\hat{w}_{x,y}}{\hat{h}_{x,y}}\right)\right)^2$$

$$\alpha_{x,y} = \frac{v}{1-q_{x,y}}$$

$$\hat{y}_c = \sigma(\cdot)$$

$$\hat{q}_{x,y} = \text{softmax}(\cdot)$$

where $N_{pos}$ is the total number of grid points including a target object;

$$c^*_{x,y}$$

is an indicator function, indicating which grids including objects; $\beta_{x,y}$ and $\hat{\beta}_{x,y}$ respectively represent coordinate, width and height information of a real bounding box and a predicted bounding box, so the value of $q_{x,y}$ ranges from 0 to 1, the closer the value is to 1, the higher the matching degree between the predicted box and the real box and the larger the overlapping region; $b_{x,y}$ represents the coordinates of a central point of the real bounding box; $y_c$ is a truth label on each grid point (x, y) of the input image belonging to the category C, regardless of whether there is an object in the grid point; $w_{x,y}$ and $h_{x,y}$ respectively represent width and height of the corresponding bounding box; $v_{x,y}$ And $\alpha_{x,y}$ are auxiliary variables for adjusting the loss related to the length-width ratio; $\hat{y}_c$ represents the prediction probability of the category which is generated by a sigmoid activation function; $\hat{q}_{x,y}$ is the objective score output by the softmax function; and $\hat{w}_{x,y}$ and $\hat{h}_{x,y}$ respectively represent the width and height of the predicted bounding box, when they are used as a ratio, this value reflects the shape information of the predicted box, that is, the aspect ratio.

A Soft-NMS method is used for post-processing, which is an improved version of the traditional NMS method. Soft-NMS does not simply discard the overlapping bounding boxes, but applies soft threshold penalty to the overlapping bounding boxes to reduce the confidence degree of the overlapping region, so that those bounding boxes that may still be an effective detection result although they overlap to a certain extent can be better retained, thereby improving the detection accuracy and reducing the redundancy detection;

a small target detection model based on the algorithm is trained according to the set training parameters and processing method; and the trained small target detection model based on improved YOLOv8 is subjected to performance evaluation to obtain a network model with good convergence.

S5: the model is evaluated. The average detection accuracy and detection speed of the model are evaluated according to the small target detection model based on improved YOLOv8 obtained after training.

A sample image in the training set is input into the small target detection model based on improved YOLOv8 by setting corresponding parameters, the number of iteration steps are set, and a weight file with the optimal small target detection is obtained through training. The direction of network training is adjusted continuously by a loss function, whether the training achieves the expected effect is validated by calculating the map value of the validation set, and the optimal weight file is selected by screening the trained weight file and is loaded into the small target detection model based on improved YOLOv8 to serve as a small target detection model in the unmanned aerial vehicle scenario.

S6: a road surface disease image to be detected is input into the trained small target detection model based on improved YOLOv8 for identification to obtain a detection result.

Figure 6:
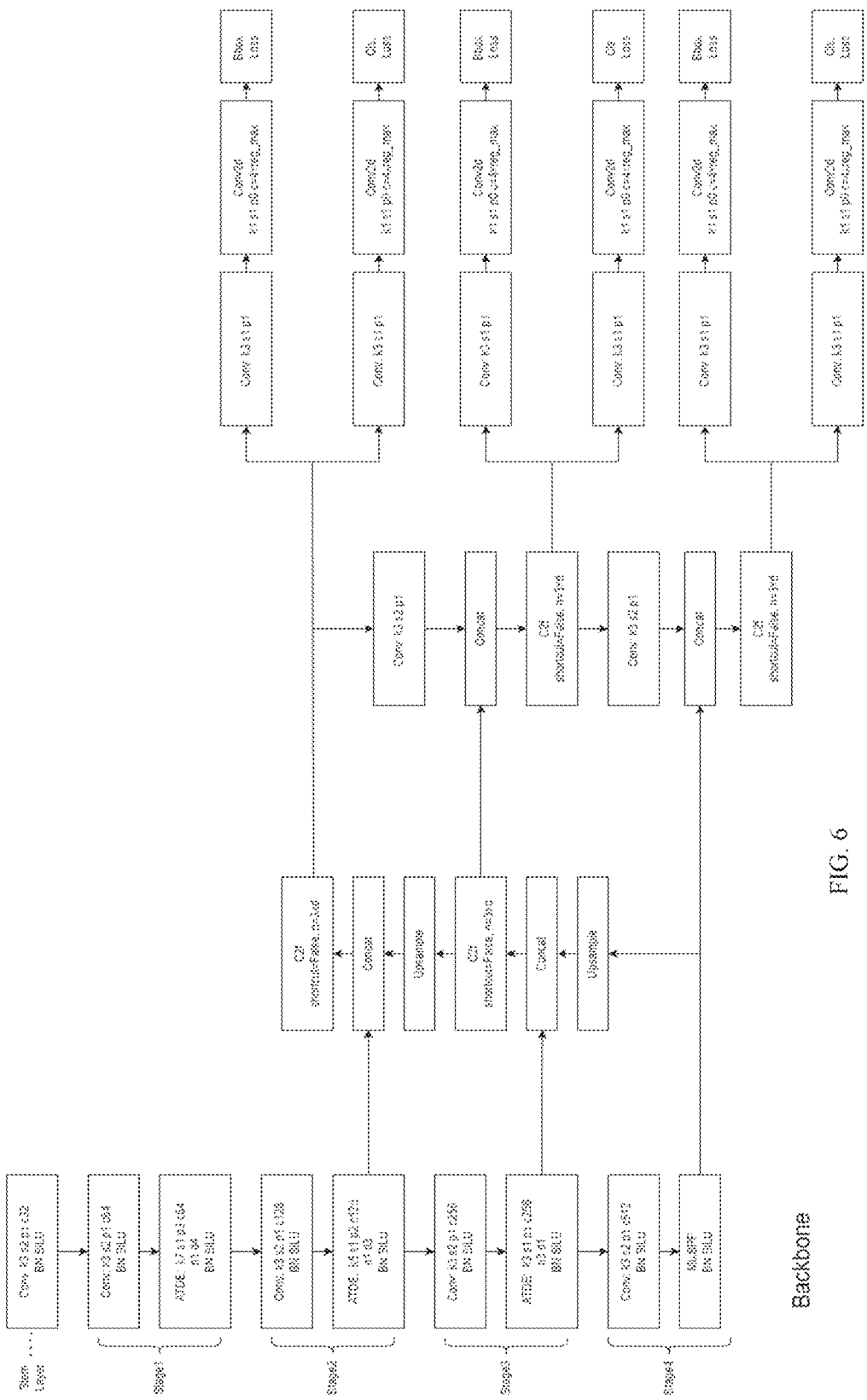
FIG. 6 is a structural schematic diagram of an overall network of a small target detection method based on improved YOLOv8 according to the present disclosure.

Referring to FIG. 6, in this embodiment, under the software configuration environment of CentOS 7 operating system, Python version 3.8.18, GPU version NVIDIA TITAN Xp 12G, CUDA version 11.3, Pytorch version 1.12.1 and MMDetection version 3.2.0, ATDeNet has higher average accuracy than CSPDarkNet under the YOLOv8 framework, especially when processing small and medium targets. Meanwhile, ATDeNet has a small parameter quantity, which means that ATDeNet has better calculation efficiency. In addition, although the FPS of ATDeNet is slightly high, the difference is not big, so a significant influence may not be generated in the actual application. In general, ATDeNet is a better choice under the framework of YOLOv8, especially when it is necessary to improve the accuracy of small target detection.

Embodiment 2

Based on Embodiment 1, this embodiment discloses a small target detection System based on improved YOLOv8, including:
  a detection module, configured to input a small target image to be detected into a pre-trained small target detection model based on the improved YOLOv8 for identification to obtain a detection result,
  where a method for training a small target detection model based on the improved YOLOv8 includes:
  a small target image data set is acquired and divided into a training set and a validation set;
  a backbone network of YOLOv8 is replaced with a backbone network ATDeNet and the small target detection model based on the improved YOLOv8 is constructed; and
  the constructed small target detection model is trained by using the training set and the validation set to obtain a trained small target detection model based on the improved YOLOv8.

Embodiment 3

This embodiment provides a computer-readable storage medium, storing a computer program, where when the computer program is executed by a processor, the small target detection method based on improved YOLOv8 according to Embodiment 1 is implemented.

Those skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory and the like) that include computer-usable program code.

The present disclosure is described with reference to the flowcharts and/or block diagrams of the methods, devices (systems), and computer program products according to the embodiments of the present disclosure. It is to be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may alternatively be stored in a computer-readable memory that can instruct a computer or another programmable data processing device to operate in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The above are only preferred embodiments of the present disclosure. It should be noted that for those of ordinary skill in the art, several improvements and variations can be made without departing from the technical principles of the present disclosure, and these improvements and variations should also be considered within the scope claimed in the present disclosure.

What is claimed is:

1. A small target detection method based on improved YOLOv8, characterized in that, comprising:
   inputting a small target image to be detected into a pre-trained small target detection model based on the improved YOLOv8 for identification to obtain a detection result,
   wherein a method for training a small target detection model based on the improved YOLOv8 comprises:
   acquiring a small target image data set and dividing the small target image data set into a training set and a validation set;
   replacing a backbone network of YOLOv8 with a backbone network ATDeNet and constructing the small target detection model based on the improved YOLOv8;
   wherein the backbone network ATDeNet comprises an input layer Stem, a first backbone part Stage1, a second backbone part Stage2, a third backbone part Stage 3 and a fourth backbone part Stage 4, the input layer Stem comprises a convolution layer, the first backbone part Stage1 comprises a convolution layer and an ATDE module, the second backbone part Stage2 comprises a convolution layer and the ATDE module, the third backbone part Stage3 comprises a convolution layer and the ATDE module, the fourth backbone part Stage4 comprises a convolution layer and a pyramid structure module MixSPP;
   the convolution layers of the input layer and the backbone part comprise batch normalization (BN) and a SiLU activation function, and are provided with different convolution parameters;
   the module ATDE comprises the depthwise separable convolutions and a convolution with the convolution kernels of 1*1;
   the module ATDE is capable of performing multi-level splicing on images, using 1*1 convolution to increase dimension and then decrease dimension, and extracting spatial details of the images, and the pyramid structure module MixSPP comprises a convolution layer, a maximum pooling layer and a depthwise separable convolution, and the pyramid structure module MixSPP parallelizes spatial pyramid pooling and convolution modules and performs layer-by-layer fusion;
   training the constructed small target detection model by using the training set and the validation set to obtain a trained small target detection model based on the improved YOLOv8;
   wherein the MixSPP module comprises 5 convolutions, 3 maximum pooling layers, a depthwise separable convolution, the MixSPP module uses a convolution layer with a convolution kernel size of 1*1, a stride of 1, no padding and a quantity of output channels of 512 to perform convolution operation on the image, and preliminarily processes the image by the batch normalization and the SiLU activation function; and then, the image is divided into three regions with different sizes for maximum pooling operation, the three regions have convolution kernel sizes of k13*13, k9*9 and k5*5 respectively, the stride of 1 and no padding, a maximum pooling result of each region is used as separate feature mapping; and then these features mapping passes through a depthwise separable convolution layer (DSConv), including a depthwise convolution layer and a point-by-point convolution layer, parameters of the depthwise convolution layer and the point-by-point convolution layer are: k=3, s=1, p=1 and c=512, which means using the depthwise convolution layer with a convolution kernel of 3*3, a stride of 1, a padding of 1 and a quantity of output channels of 512.

2. The small target detection method based on improved YOLOv8 according to claim 1, characterized in that
   the small target image data set comprises a VisDrone2019 target detection data set.

3. The small target detection method based on improved YOLOv8 according to claim 1, characterized in that
   the small target image data set comprises small target images under different scenarios, weather and light conditions.

4. The small target detection method based on improved YOLOv8 according to claim 1, characterized in that
   further comprising: dividing a test set from the small target image data set, and using the test set to analyze the detection accuracy, detection speed and parameter quantity of the trained small target detection model based on the improved YOLOv8.

5. A non-transitory computer storage medium, storing a computer program thereon, characterized in that, when the computer program is executed by a processor, the small target detection method based on improved YOLOv8 according to claim 1 is implemented.

\* \* \* \* \*